Oct. 19, 1954 C. W. KELSEY ET AL 2,691,928
SOIL WORKING DEVICE
Filed July 12, 1949 2 Sheets-Sheet 2
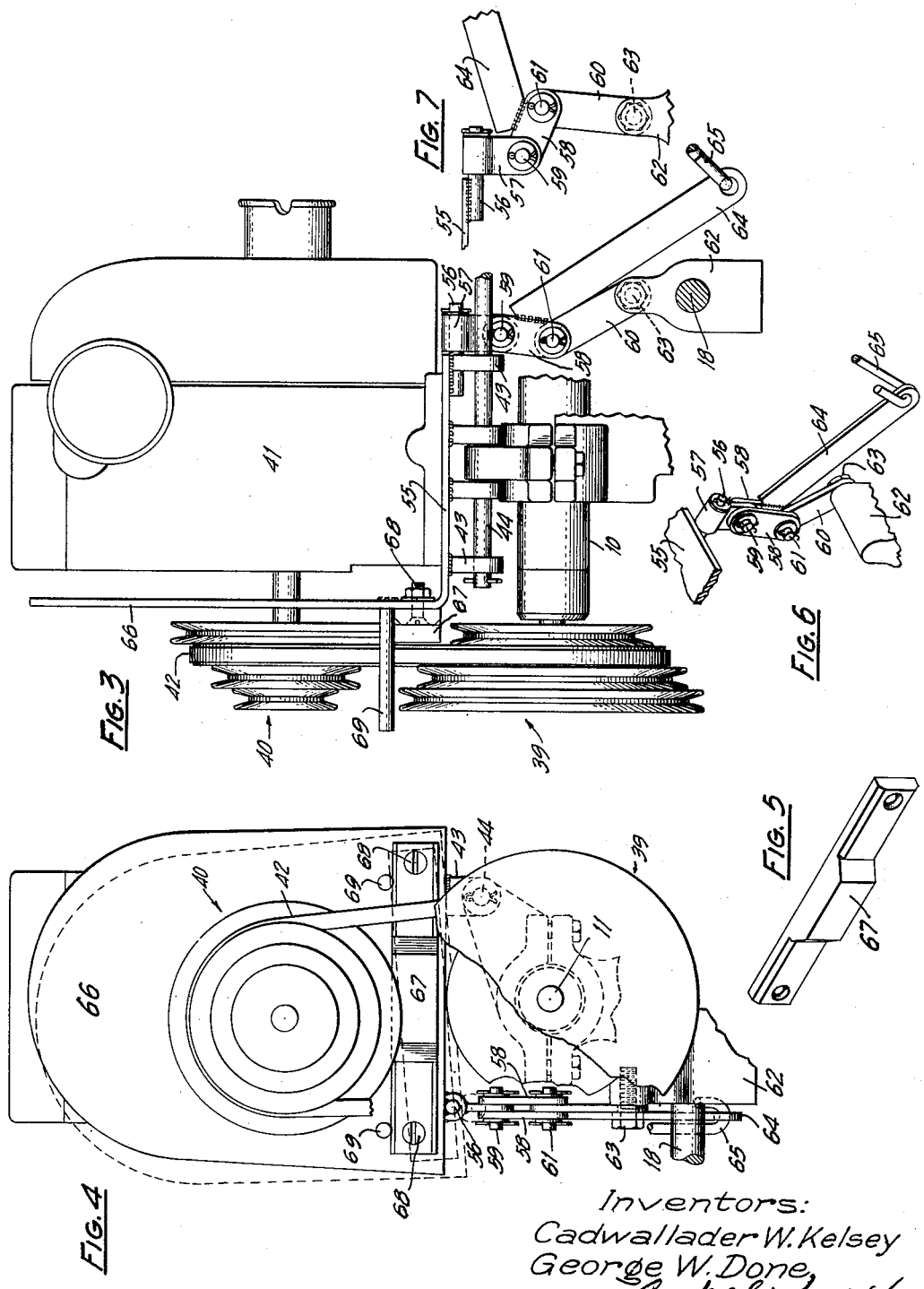
Inventors:
Cadwallader W. Kelsey
George W. Done,
by
Their Attorneys.

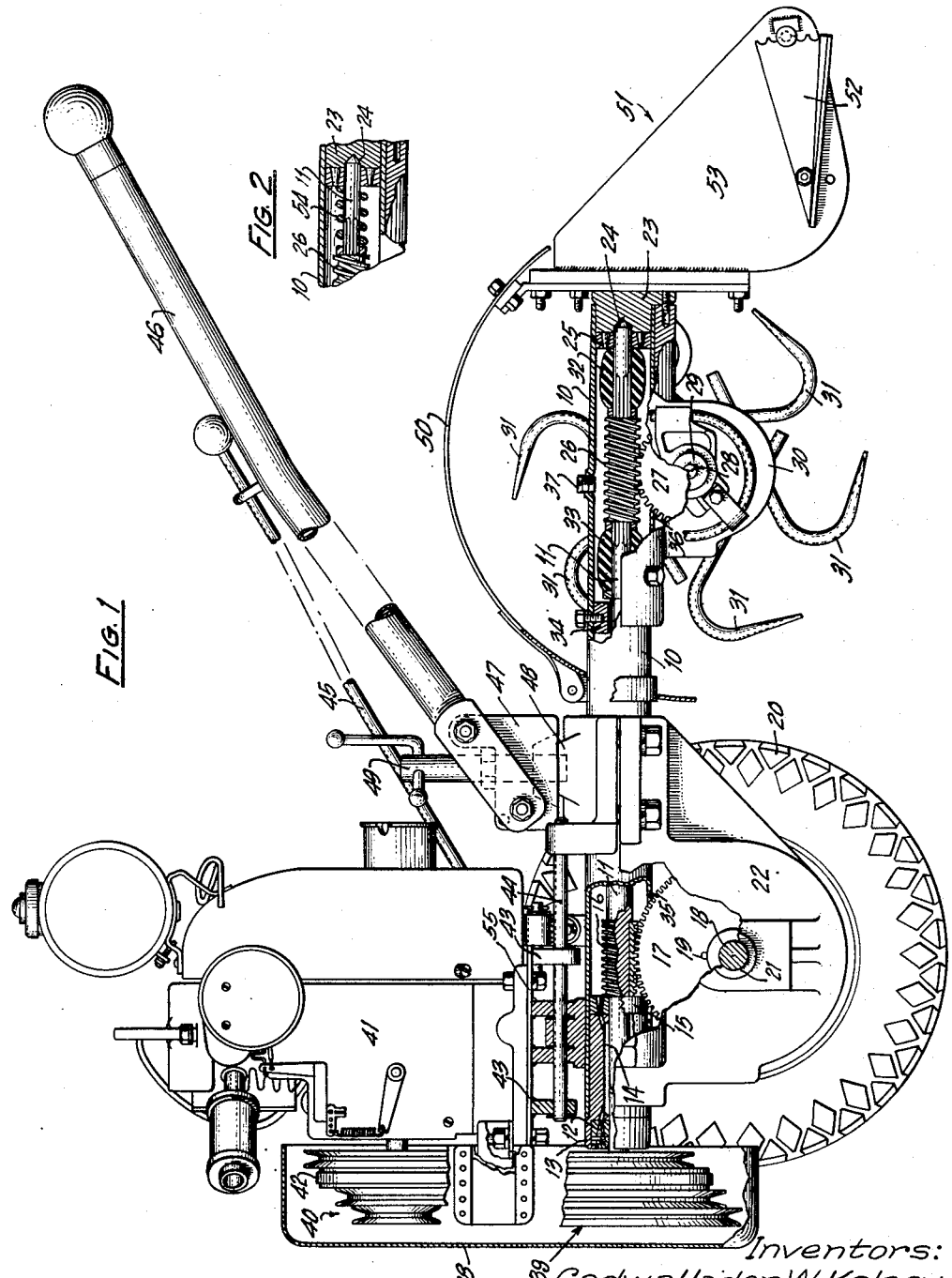

Patented Oct. 19, 1954

2,691,928

UNITED STATES PATENT OFFICE 2,691,928

SOIL WORKING DEVICE

Cadwallader W. Kelsey and George W. Done, Troy, N. Y.

Application July 12, 1949, Serial No. 104,162

12 Claims. (Cl. 97—40)

1

This invention relates to improvements in soil tilling machines. More particularly, it has to do with a soil tilling machine having a rotary soil tilling mechanism mounted on a tubular chassis, which chassis also constitutes a housing for means which motivate the machine and the soil working mechanism.

Generally, it is an object of the invention to provide a soil tilling machine, of the rotary tilling type, which is simplified in construction, operates with fewer number of parts than other similar machines of this type, is economical to manufacture, sturdy and durable of construction, easily assembled, and which will be substantially free from wear and tear and many mechanical difficulties heretofore encountered in conventional machines.

More specifically, it is an object of the invention to provide a soil tilling machine having a rotary soil tilling mechanism comprising a hollow chassis having a driving shaft mounted therein means connected to one end of the driving shaft for motivating the machine, and reciprocatory means connected to the opposite end of the driving shaft for motivating the tilling mechanism in a manner to provide a shock absorbing action for the tilling mechanism during operation.

Another object of the invention is to provide a novel type of hollow, elongated chassis which supports the traction wheels for driving the machine, the rotary soil tilling mechanism, the driving motor and associated parts for driving the machine and the rotary tilling mechanism.

Another object of the invention is to provide a tubular chassis containing the transmission or driving members for motivating the machine as well as the rotary tilling unit, the chassis being adapted to hold a lubricant sealed therein so that all of the means which are cooperatively associated with the driving members within the chassis will operate in the lubricant.

Another object of the invention is to provide a shock absorbing device including a reciprocatory driving member for the rotary tilling unit which is mounted on the driving member in the chassis, whereby the tilling unit, upon being retarded during rotation due to obstacles in the soil, will transfer resulting shocks to the reciprocatory member in such a manner that a shock absorbing action is provided for the tilling mechanism.

Another object of the invention is to provide a tiltable multiple speed motor for such a machine in which driving and driven sheaf pulleys are connected by a belt, whereby tilting of the motor will cause the belt to be engaged, thereby functioning as a clutch for the machine.

2

Another object of the invention is to provide a tiltable motor for such a machine, equipped with such pulleys, and provided with a brake block which will engage one of the driven sheaf pulleys to support the motor when it is downwardly tilted as well as to bring the machine to a halt.

A further object of the invention is the provision of a tiltable motor for such a machine, in which the motor has a set of driving pulleys and the machine has a set of driven pulleys, both sets of pulleys being connected by a belt, whereby the tilting action of the motor will function as a clutch to engage and disengage the belt with said pulleys, and means cooperatively associated with the motor to disengage the belt from the driving pulleys when the motor is downwardly tilted so that no further driving force will be imparted by the belt to the driven pulleys on the machine.

Other objects of the invention will in part be obvious and will in part appear hereinafter.

The invention accordingly comprises the features of construction, combination of elements, and arrangement of parts which will be exemplified in the construction hereinafter described and the scope of the application of which will be indicated in the claims.

For a fuller understanding of the nature and objects of the invention, reference should be had to the following detailed description, taken in connection with the accompanying drawings, in which:

Fig. 1 is a side elevational view, partly in section and with parts broken away, illustrating a preferred embodiment of the invention;

Fig. 2 is a fragmentary sectional view of a portion of a modified form of reciprocatory means for imparting a shock absorbing action to the rotary tilling mechanism;

Fig. 3 is a side elevational view, with parts broken away, of a motor similar to that shown in Fig. 1, mounted on the chassis of the machine and illustrating the arrangement of parts for tilting the motor, a brake for the machine and means for disengaging the belt from the driving pulleys when the motor is downwardly tilted;

Fig. 4 is a front elevational view, with parts broken away, of the tilting motor and related parts shown in Fig. 3;

Fig. 5 is a perspective view of a brake block carried by the motor for stopping the machine and supporting the motor in its lowermost position;

Fig. 6 is a perspective view with parts broken away showing a toggle arrangement for tilting the motor and illustrating the position of the same when the motor is in raised or belt-engaging position; and Fig. 7 is an elevational view with parts broken away showing the position of the toggle arrangement when the motor is lowered into position to disengage the belt in order to stop the machine.

Referring more particularly to the drawings, there is disclosed an elongated tubular chassis 10 disposed substantially along the longitudinal axis of the machine. This chassis constitutes the housing for various parts of the driving mechanism.

A driving shaft 11 is mounted to rotate in the tubular chassis or housing 10. The front end of the shaft 11 is journaled in a ball bearing 12, behind an oil seal 13. A sleeve 14 extends rearwardly along the shaft and is provided with oil passages for lubricating the forward end of the shaft with a lubricating medium. The lubricating medium fills the housing and is sealed therein. A thrust bearing 15, for the shaft 11, abuts the sleeve 14.

A driving member, or worm 16, is mounted on the shaft 11 adjacent the thrust bearing 14. This worm meshes with a driven member, or worm wheel 17. Extending through the worm wheel 17, transversely of the shaft 11, is another shaft 18 secured to the worm wheel by means of set screws 19. The shaft 18 carries a traction wheel 20 at each end and is rotatably mounted in bearings 21 in a housing 22 secured underneath the tubular chassis 10.

At the rear end of the housing 10 is a plug 23 which acts as a seal against escape of the lubricating medium with which the chassis or housing is filled. The plug 23 may be slightly counterbored as at 24 to receive the end of the shaft 11 in case of axial movement of the shaft. Mounted within the tubular chassis 10, against the plug 23, is another thrust bearing 25 in which the rear end of the shaft is journaled.

The shaft 11 preferably is splined at its rearward end as shown in the drawing. Secured around the splined portion of the shaft is a driving member, or worm, 26 which is permitted to reciprocate on the shaft 11 when the machine is in operation as will more fully be described hereinafter. This worm 26 constitutes the driving member for the rotary tilling device and is meshed with a worm wheel 27. Extending through this worm wheel is a shaft 28 disposed transversely of the driving shaft 11. This shaft is secured to the worm wheel in a manner similar to that by which the transverse shaft 18 is secured to the worm wheel 17 and is rotatably mounted in bearings 29 in a housing 30 secured to the tubular chassis 10.

Mounted on the shaft 28, on each side of the chassis 11, are rotary tilling tines 31 which are of a conventional type and need no further description.

The worm 26, and the worm wheel 27 are both unique in construction with respect to the pitch angle of the teeth. That is, we have discovered that the shock absorbing action can be enhanced considerably if the pitch angles of the teeth are not less than 15° and not more than 25°. Such an arrangement of the meshed teeth provides a gradual or slightly delayed braking action. In other words, when the tines 31 encounter an obstacle in the soil and momentarily are brought to an abrupt halt, the worm and worm wheel will continue to rotate, relative to each other, a slight distance so that the abrupt halting action of the tines is not repeated in the worm and worm wheel, which action would occur if the pitch angles of the teeth were less than 15° or more than 25°. Such an angle can be determined, for example, when the helical convolution of any line, or thread, around a cylinder is plotted to represent a straight line, and another line or plane is drawn normal or perpendicular along, or parallel, to the resulting plotted line, or thread, whereupon the angle formed thereby may be regarded as the pitch angle. The result of selecting a pitch angle for the thread on the worm and worm-wheel which is between 15° and 25° provides the optimum range within which a desired amount of gradual coasting or slipping will be permitted between the worm or worm-wheel, or gear, which will tend to bring about a gradual stalling action of the motor rather than an abrupt shock equivalent to the shock received by the tines on the tilling mechanism when an immovable object is encountered thereby. This can perhaps be more readily visualized if it is assumed that the thread on a worm is perpendicular or normal to its longitudinal axis, that is, at 0°. Of course, under such conditions, the worm would be unable to move the worm-wheel. On the other hand, if this pitch angle were as great as 45°, it would be substantially impossible for the worm-wheel to be moved by the worm because it would, in effect, tend to become locked. These conditions are gradually minimized as the pitch angle approaches 15° and are ideal between 15° and 25°, beyond which latter angle the tendency to lock will again appear. Therefore, the motor will not receive an acute shock and be brought to an abrupt halt or instantly stalled. On the contrary, the motor will stall, which is desirable, but the stalling action will be gradual. Thus, the strain and shock on all connecting parts between the tines and the motor are absorbed or relieved.

Around the shaft 11 on each side of the worm 26 are two compressible elements 32 and 33 mounted to rotate with the shaft 11 and the worm wheel 26. Preferably, these members are made of a suitable rubber-like material which will withstand any deteriorating effect of the lubricating medium. Compressible element 32 is disposed between the thrust bearing 25 and the worm 26. Compressible element 33 is disposed between a bushing 34 around the shaft 11 and the worm 26.

It will be observed that the tubular chassis 11 has a slot 35 in its lower forward end, and a similar slot 36 at its lower rearward end. These apertures are provided so that the worm wheels 17 and 27 can engage the driving worms 16 and 26 respectively. The housings 22 and 30 around the worm wheels 17 and 27 are secured to the tubular housing 10 in such a manner that there will be no escape of any lubricating medium contained therein.

A plug 37 is provided in the tubular housing 10. Removal of this plug provides a proper opening to feed a lubricating medium for all parts contained within the tubular housing 10 and the housings 22 and 30.

A multiple speed driving arrangement of pulleys is contained within a housing 38 at the forward end of the machine. This arrangement constitutes two groups of stepped pulleys indicated generally at 39 and 40 respectively.

The stepped pulleys 39 are secured to the front end of the driving shaft 11. The stepped pulleys 40 are secured to the front end of the driving shaft of a conventional driving motor 41. Both sets of pulleys are connected by a belt 42.

The motor 41 is mounted on the chassis in such a manner that it can be tilted to tighten and loosen the belt 42 with respect to the pulleys 39 and 40 and perform the function of a clutch. Briefly, in order that this may be accomplished, the motor 41 is secured to a base plate 55 having lugs 43 secured to a shaft 44. On the other side of the base of the motor are adjustments (not shown) which control the distance which the motor is permitted to tilt.

When the motor is tilted so that the groups of pulleys 39 and 40 approach each other, the belt 42 will be slackened and any suitable speed desired can be obtained by shifting the belt. The tilting of the motor may be controlled by a clutch control arm 45 cooperatively connected to a suitable link arrangement (not shown in Fig. 1) which in turn is connected to the base 55. It will be obvious that after the motor has been started, and the clutch arm moved to tilt the motor so that the group of pulleys 40 move away from the group of pulleys 39, the belt 42 will lose its slack, the power from the motor 41 will be transferred to the pulleys 39, through the pulleys 40 and belt 42, and the entire driving mechanism for the machine, as well as the driving mechanism for the rotary tilling device, will be set in motion.

To guide the device, handle bars 46, secured to a head 47 are provided. This head constitutes the female portion of a fastening arrangement and engages a cone-shaped arbor 48, both of which are securely tightened in position by means of a stud 49 in order to hold the handle bars in rigid and firm position. The bars can be adjusted to the right or left of the machine, as well as centrally thereof, in a novel manner in order to make it possible, for example, to avoid walking on a newly made seed bed. This device is the subject matter of another patent application. As indicated in the drawing, the parts 47 and 48, together with the structure supporting the motor, may be clamped around the tubular chassis or housing 10 in conjunction with the housing 22.

A conventional shield 50 is mounted over the tines to prevent the soil from being thrown upwardly and rearwardly when the device is in operation.

Secured to the rear end of the tubular housing 10 is a so-called shear plate and depth regulator indicated generally at 51. This member serves several functions. It is well known that, with rotary tilling devices of the type herein disclosed, where rotating tines are used, the soil is not tilled between the groups of tines because they are disposed to the right and left of the transverse driving shaft on which they are mounted. Therefore, it is necessary to plow this untilled area and this is accomplished by means of a plow member or shoe 52 adjustably mounted on each side of the vertical plate 53. The shear plate and depth regulator also prevents the rear end of the machine from rising out of the ground during the tilling operation and maintains the tines in position so that they will not tend to crawl out of the soil.

In operation, after the motor has been started and the clutch control arm 45 has tilted the motor in such a manner that the belt 42 is tightened with respect to the two groups of pulleys 39 and 40, the entire driving mechanism in the tubular housing will be set in motion. The worm 16 on the shaft 11 actuates the worm wheel 17 which in turn rotates the traction wheels 20, thereby driving the machine forward. At the same time, the rotation of the shaft 11 will cause the worm 26 to actuate the worm wheel 27, the shaft 28, and the tines 31. As the machine is advanced and the tines encounter obstacles of any kind in the soil there is a momentary retarding effect on the tilling mechanism. However, because of the worm 26 mounted on the splined shaft 11, there will be imparted to the worm a reciprocatory motion against the cushioning action of the members 32 and 33. With such an arrangement, there is a distinct shock absorbing action and dampening effect which takes place within the tubular housing which will prevent the motor from immediately stalling but will permit it to stall gradually, if at all. With the removal of shock, there is little danger of any of the parts readily breaking, especially the tines which heretofore have often been so stressed as to become broken, bent or twisted.

In place of the compressible elements 32 and 33, coil springs 54 may be substituted as shown in the modification in Fig. 2 and such an arrangement needs no further detailed description.

Figs. 3 through 7 illustrate a motor identical to that shown in Fig. 1 but more clearly illustrating the arrangement of parts. In Fig. 1, the purpose is to illustrate the motor generally with emphasis being placed upon the driving mechanism for the machine and the rotary tilling mechanism. In Figs. 3 and 4, the base plate 55 has a pin 56 welded to its under side. A pivotally-mounted link 57 is mounted on the pin 56. A bifurcated link 58 is pivotally secured to the link 57 by means of a pin 59. Another link 60 is pivotally connected to the bifurcated link 58 by pin 61 at one end and pivotally secured to an upstanding member 62 on the axle or shaft 18 by means of a pivot screw 63. A lever 64 is integrally connected, as by welding, to the right arm of the bifurcated link 58. Connected to the free end of the link 64 is a clutch link 65 which connects with the clutch arm 45.

As illustrated in Figs. 3, 6 and 7, such an arrangement of parts provides a toggle action for raising and lowering the motor about the pivot pin 44. When the various parts are positioned to the left of center as shown in Figs. 3 and 6, the motor will be in raised position and the belt 42 will be brought into driving engagement with the pulleys 39 and 40.

The position of the toggle joints provided by the link arrangement shown by the parts 58, 60, etc., will prevent the motor from lowering further because it is held in locked position as the toggle arrangement passes to the left of center. When the clutch control arm 45 is moved toward the operator, the toggle arrangement will pass to the right of center as depicted in Fig. 7 and the motor will pivot downwardly around the pivot pin or shaft 44, thereby bringing the belt 42 out of engagement with the pulleys 39 and 40.

Upwardly extending from the base plate 55 is a vertical plate 66 through which the shaft of the motor passes. Across the bottom of the plate 66, slightly above the base plate 55, is the brake block 67, preferably made of hard wood or any other suitable material. This block is secured in position to the plate 66 by bolts 68. Forwardly extending from the plate 66, adjacent each side of the belt 42, are belt stops or pins 69. The brake block 67 abuts the under side of these pins which reinforce the brake block. When the motor is lowered to the down or dotted line position as shown in Fig. 4, the toggle arrangement will take the position shown in Fig. 7. The brake block, with the weight of the motor behind it, will come in contact with the smaller of the driven sheaf pulleys as shown in the drawing, thus acting as a brake to stop motivation of the machine and prevent it from creeping, and at the same time provide a stop or rest against further downward movement of the motor. However, the motor will still be running and there will be a tendency for the belt to belly outwardly without disengaging from the sheaf of the pulley. It is desirable to disengage the belts entirely from the driving pulleys 40 and this is performed by the pins 69. As the belt sections between the pulleys belly outwardly because of the centrifugal driving force of the driving pulleys, they will strike the pins 69 thus raising the engaged portion of the belt on the driving pulley out of engagement therewith so that the motor will be free to turn without further rotation of the belt and without imparting any driving power to the driven pulleys 39.

A simplified machine of the foregoing type has many advantages. The reciprocatory means above described overcomes the use of slip-clutches, springs on the tines, and other devices heretofore utilized in order to attempt to solve the problem of shock, breakage, and quick stalling of the motor. It is desirable, of course, to have the motor stall when insurmountable obstacles are encountered in the soil. Stalling, by means of the present invention, is accomplished softly and gracefully and without undue or appreciable shock. The tubular chassis is adapted to support the wheels for driving the machine, the tilling unit and the driving motor. It also provides a sealed oil reservoir for complete lubrication, with the exception of the motor, for all parts cooperatively associated within the chassis or housing. The pivotal mounting of the motor eliminates the use of a clutch, the machine is readily stopped by the brake block which pivots with the plate supporting the motor and also provides a stop for the motor. The belt stops quickly disengage the belt from the driving pulleys so that the machine will immediately be brought to a halt and creeping eliminated.

It will thus be seen that the objects hereinbefore set forth may readily and efficiently be attained and since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention what we claim as new and desire to secure by Letters Patent is:

1. In a rotary soil tilling machine, having a rotary soil tilling mechanism, the improvement comprising a tubular chassis having a slotted opening at its forward underside and a slotted opening at its rearward underside, a rotatable driving shaft mounted within said chassis with a portion projecting outwardly of the forward end thereof, a driving gear, mounted on said shaft, overlying said forward slotted opening, a driven gear, extending through said forward slotted opening, meshed with said driving gear and adapted to motivate said machine; a reciprocable driving gear, mounted on said shaft, overlying said rearward slotted opening, a driven gear, extending through said rearward slotted opening, meshed with said last named driving gear to rotate said tilling mechanism; a tiltable driving motor mounted upon said chassis, a driving pulley connected to said motor, a driven pulley connected to the projecting portion of said shaft, a driving member connecting said pulleys; and manually operable means to tilt said motor to operative and inoperative positions.

2. A machine as defined in claim 1, and further characterized in that said tilting means comprises a toggle device so constructed and arranged that said motor can be locked in elevated operative position.

3. In a rotary soil tilling machine, having a rotary soil tilling mechanism, the improvement comprising an elongated tubular chassis having a slotted opening at its forward underside, and a slotted opening at its rearward underside, said chassis constituting the frame for said machine and mounting the tilling mechanism, driving wheels and supporting a driving motor; a rotatable driving shaft mounted to rotate within said tubular chassis; a forward driving gear mounted on said shaft, overlying said forward slotted opening; a driven gear extending through said forward slotted opening, meshed with said driving gear and adapted to motivate said machine; another driving gear mounted on said shaft, overlying said rearward slotted opening; another driven gear extending through said rearward slotted opening, meshed with said last named driving gear to rotate said tilling mechanism; and a driving motor mounted upon said chassis and being cooperatively connected to said driving shaft to rotate the same; said forward driving gear being positively fixed to said shaft to rotate therewith at all times when said shaft is rotated; and said last named driving gear being mounted to reciprocate on said shaft.

4. In a rotary soil tilling machine, having a rotary soil tilling mechanism, the improvement comprising an elongated tubular chassis having a slotted opening at its forward underside, and a slotted opening at its rearward underside, said chassis constituting the frame for said machine and mounting the tilling mechanism, driving wheels and supporting a driving motor; a rotatable driving shaft mounted to rotate within said tubular chassis; a forward driving gear mounted on said shaft, overlying said forward slotted opening; a driven gear extending through said forward slotted opening, meshed with said driving gear and adapted to motivate said machine; another driving gear mounted on said shaft, overlying said rearward slotted opening; another driven gear extending through said rearward slotted opening, meshed with said last named driving gear to rotate said tilling mechanism; and a driving motor mounted upon said chassis and being cooperatively connected to said driving shaft to rotate the same; said forward driving gear being positively fixed to said shaft to rotate therewith at all times when said shaft is rotated; said last named driving gear comprising a worm adapted to reciprocate on said shaft.

5. In a rotary soil tilling machine, having a rotary soil tilling mechanism, the improvement comprising an elongated tubular chassis having a slotted opening at its forward underside, and a slotted opening at its rearward underside, said chassis constituting the frame for said machine and mounting the tilling mechanism, driving wheels and supporting a driving motor; a rotatable driving shaft mounted to rotate within said tubular chassis; a forward driving gear mounted on said shaft, overlying said forward slotted opening; a driven gear extending through said forward slotted opening, meshed with said driving gear and adapted to motivate said machine; another driving gear mounted on said shaft, overlying said rearward slotted opening; another driven gear extending through said rearward slotted opening, meshed with said last named driving gear to rotate said tilling mechanism; and a driving motor mounted upon said chassis and being cooperatively connected to said driving shaft to rotate the same; said forward driving gear being positively fixed to said shaft to rotate therewith at all times when said shaft is rotated; said last named driving gear comprising a worm adapted to reciprocate on said shaft, and a cushioning member carried by said shaft to receive the thrust of said reciprocating worm.

6. In a rotary soil tilling machine, having a rotary soil tilling mechanism, the improvement comprising an elongated tubular chassis having a slotted opening at its forward underside, and a slotted opening at its rearward underside, said chassis constituting the frame for said machine and mounting the tilling mechanism driving wheels and supporting a driving motor; a rotatable driving shaft mounted to rotate within said tubular chassis; a forward driving gear mounted on said shaft, overlying said forward slotted opening; a driven gear extending through said forward slotted opening, meshed with said driving gear and adapted to motivate said machine; another driving gear mounted on said shaft, overlying said rearward slotted opening; another driven gear extending through said rearward slotted opening, meshed with said last named driving gear to rotate said tilling mechanism; and a driving motor mounted upon said chassis and being cooperatively connected to said driving shaft to rotate the same; said forward driving gear being positively fixed to said shaft to rotate therewith at all times when said shaft is rotated; said last named driving gear comprising a worm adapted to reciprocate on said shaft, and a cushioning member carried by said shaft to receive the thrust of said reciprocating worm; said cushioning member comprising rubber.

7. In a rotary soil tilling machine, having a rotary soil tilling mechanism, the improvement comprising an elongated tubular chassis having a slotted opening at its forward underside, and a slotted opening at its rearward underside, said chassis constituting the frame for said machine and mounting the tilling mechanism driving wheels and supporting a driving motor; a rotatable driving shaft mounted to rotate within said tubular chassis; a forward driving gear mounted on said shaft, overlying said forward slotted opening; a driven gear extending through said forward slotted opening, meshed with said driving gear and adapted to motivate said machine; another driving gear mounted on said shaft, overlying said rearward slotted opening; another driven gear extending through said rearward slotted opening, meshed with said last named driving gear to rotate said tilling mechanism; and a driving motor mounted upon said chassis and being cooperatively connected to said driving shaft to rotate the same; said forward driving gear being positively fixed to said shaft to rotate therewith at all times when said shaft is rotated; said last named driving gear comprising a worm adapted to reciprocate on said shaft, and a cushioning member carried by said shaft to receive the thrust of said reciprocating worm; said cushioning member comprising a coil spring.

8. A soil tilling machine having a motivating mechanism and a rotary soil tilling mechanism, comprising a single longitudinally extending centrally disposed integral tubular housing constituting the sole chassis for said machine, a single integral driving shaft extending therethrough connecting each said mechanism, a tiltable motor mounted above and intermediate the ends of said chassis, multiple speed driving pulleys connected to said motor, multiple speed driven pulleys connected to the forward end of said shaft, which pulleys are connected by a belt adapted to engage and disengage with said pulleys for motivating and halting said machine and said tilling mechanism when said motor is tilted upwardly and downwardly respectively, means cooperatively connected to said machine to tilt said motor, a brake member cooperatively associated with said motor and adapted to tilt therewith to engage one of said driven pulleys and to check the downward tilting action of the motor, rotatable driving means cooperatively connected with the forward end of said shaft, said means being so constructed and arranged with respect to said shaft and said motor as to advance said machine over a ground surface, and rotary soil working means cooperatively connected to the rearward end of said shaft, said last named means being so constructed and arranged with respect to said shaft and said motor that said soil is worked as said machine is advanced over said ground surface.

9. A soil tilling machine having a motivating mechanism and a rotary soil tilling mechanism, comprising a single longitudinally extending centrally disposed integral tubular housing constituting the sole chassis for said machine, a single integral driving shaft extending therethrough connecting each said mechanism, a tiltable motor mounted above and intermediate the ends of said chassis, a driving pulley connected to said motor, a driven pulley connected to the forward end of said shaft, which pulleys are connected by a belt adapted to engage and disengage with said pulleys for motivating and halting said machine and said tilling mechanism when said motor is tilted upwardly and downwardly respectively, means cooperatively connected to said machine to tilt said motor, a brake member cooperatively associated with said motor and adapted to tilt therewith to engage said driven pulley and to check the downward tilting action of the motor, rotatable driving means cooperatively connected with the forward end of said shaft, said means being so constructed and arranged with respect to said shaft and said motor as to advance said machine over a ground surface, and rotary soil working means cooperatively connected to the rearward end of said shaft, said last named means being so constructed and arranged with respect to said shaft and said motor that said soil is worked as said machine is advanced over said ground surface.

10. A soil tilling machine having a motivating mechanism and a rotary soil tilling mechanism, comprising a single longitudinally extending centrally disposed integral tubular housing constituting the sole chassis for said machine, a single integral driving shaft extending therethrough connecting each said mechanism, a tiltable motor mounted above and intermediate the ends of said chassis, a driving pulley connected to said motor, a driven pulley connected to the forward end of said shaft, which pulleys are connected by a belt adapted to engage and disengage with said pulleys for motivating and halting said machine and said tilling mechanism when said motor is tilted upwardly and downwardly respectively, means cooperatively connected to said machine to tilt said motor, elements so constructed and arranged adjacent said belt to free said belt from said driven pulley when said motor is tilted downwardly while still running to prevent rotation of said shaft, rotatable driving means cooperatively connected with the forward end of said shaft, said means being so constructed and arranged with respect to said shaft and said motor as to advance said machine over a ground surface, and rotary soil working means cooperatively connected to the rearward end of said shaft, said last named means being so constructed and arranged with respect to said shaft and said motor that said soil is worked as said machine is advanced over said ground surface.

11. In a rotary soil tilling machine, having a motivating mechanism and a rotary soil tilling mechanism, the improvement comprising a single longitudinally extending centrally disposed integral tubular housing constituting the sole chassis for said machine and having a slotted opening at its forward underside and a slotted opening at its rearward underside; a single integral rotatable driving shaft mounted at its ends within the ends of said chassis with a portion projecting outwardly of the forward end thereof connecting each said mechanism, a forward driving gear, mounted on said shaft, overlying said forward slotted opening, a driven gear, extending through said forward slotted opening, meshed with said driving gear and adapted to motivate said machine; a rearward driving gear, mounted on said shaft, overlying said rearward slotted opening, a driven gear, extending through said rearward slotted opening, meshed with said last named driving gear to rotate said tilling mechanism; and a driving motor mounted upon and overlying said chassis above said first slotted opening, and being cooperatively connected to the outwardly projecting portion of said driving shaft to rotate the same; said forward driving gear being positively fixed and drivingly connected to said shaft uninterruptedly to rotate at all times therewith and with said rearward driving gear when said shaft is rotated.

12. In a rotary soil tilling machine, having a motivating mechanism and a rotary soil tilling mechanism, the improvement comprising a single longitudinally extending centrally disposed integral tubular housing constituting the sole chassis for said machine and being provided with a slotted opening at its forward underside and a slotted opening at its rearward underside; a single integral drive shaft longitudinally extending through said tubular chassis journaled at its ends to rotate therein; a forward driving gear on said shaft overlying said forward slotted opening connecting each said mechanism; a forward driven gear extending through said forward slotted opening, meshed with said forward driving gear; a forward transverse rotatable drive shaft connected to said forward driven gear and laterally extending in opposite directions with respect thereto and with respect to said tubular chassis; a driving wheel secured to each end of said transverse shaft; a rearward driving gear on said shaft overlying said rearward slotted opening; a rearward driven gear extending through said rearward slotted opening, meshed with said rearward driving gear; a rearward transverse rotatable drive shaft connected to said rearward driven gear and laterally extending in opposite directions with respect thereto and with respect to said tubular chassis; a plurality of soil working tools mounted on said rearward transverse shaft to work the soil on both sides underneath said chassis; and a driving motor mounted on said tubular chassis, intermediate its ends, and cooperatively connected to the longitudinally extending driving shaft therein simultaneously to actuate said driving wheels and said soil working tools.

References Cited in the file of this patent

UNITED STATES PATENTS

| Number | Name | Date |
|---|---|---|
| Re. 16,266 | Wilson et al. | Feb. 16, 1926 |
| 1,345,110 | Yungling | June 29, 1920 |
| 2,154,745 | Hedgpeth | Apr. 18, 1939 |
| 2,176,261 | Kelsey | Oct. 17, 1939 |
| 2,250,391 | Ober | July 22, 1941 |
| 2,317,490 | Simpson | Apr. 27, 1943 |
| 2,433,709 | Rogers | Dec. 30, 1947 |
| 2,545,735 | Howard | Mar. 20, 1951 |

FOREIGN PATENTS

| Number | Country | Date |
|---|---|---|
| 609,082 | France | May 3, 1926 |

OTHER REFERENCES

"Rototiller—Model K5—Description, Directions for Operating, List of Spare Parts." Received September 30, 1944, pages 5–18.